US006332635B1

(12) United States Patent
Harpell (10) Patent No.: US 6,332,635 B1
(45) Date of Patent: Dec. 25, 2001

(54) CONNECTION FOR DETACHABLY CONNECTING A TOOL IMPLEMENT AND A TOOL HANDLE

(76) Inventor: William Harpell, 2380 Findlay Rd., Joyceville, Ontario (CA), K0H 1Y0

( * ) Notice: Subject to any disclaimer, the term of this patent is extended or adjusted under 35 U.S.C. 154(b) by 0 days.

(21) Appl. No.: 09/410,232

(22) Filed: Sep. 30, 1999

Related U.S. Application Data

(63) Continuation-in-part of application No. 08/905,994, filed on Aug. 4, 1997, now Pat. No. 5,971,653.

(51) Int. Cl.⁷ .............................. A01B 1/22; F16C 11/00
(52) U.S. Cl. ............................................. 294/53.5; 403/97
(58) Field of Search .................. 294/49, 51, 52, 294/53.5, 57, 59; 7/114–116; 15/144.1; 16/438; 56/400.04, 400.06; 172/372, 373, 375; 403/4, 83, 84, 87, 92–98, 102–104, 161, 163

(56) References Cited

U.S. PATENT DOCUMENTS

| 308,907 | * | 12/1884 | Lee | 294/52 |
|---|---|---|---|---|
| 453,776 | * | 6/1891 | McCory | 294/52 |
| 862,762 | * | 8/1907 | Schliesser | 294/51 X |
| 881,782 | * | 3/1908 | Elliott | 294/51 |
| 903,678 | * | 11/1908 | Copeland | 294/52 |
| 987,918 | * | 3/1911 | Schmid et al. | 294/51 |
| 1,255,428 | | 2/1918 | Kennedy . | |
| 1,362,065 | * | 12/1920 | Walker | 294/51 X |
| 1,474,650 | * | 11/1923 | Storr | 294/52 |
| 1,542,652 | | 6/1925 | Anderson . | |
| 3,115,359 | * | 12/1963 | Hendrick | 294/53.5 |
| 3,125,381 | * | 3/1964 | Anderson | 403/93 |
| 5,687,448 | * | 11/1997 | Dye | 403/4 X |

FOREIGN PATENT DOCUMENTS

| 699098 | * | 11/1940 | (DE) | 294/53.5 |
|---|---|---|---|---|
| 20167 | * | 10/1904 | (GB) | 294/52 |

* cited by examiner

*Primary Examiner*—Johnny D. Cherry (57) ABSTRACT

A tool having a tool handle and a tool head. A tubular member is provided on one end of the tool handle, with the axis of the tubular member extending transverse to the tool handle. A cylindrical member is provided on the non-working end of the tool head. The cylindrical member is slidably, rotatably, mounted within the tubular member to connect the tool head to the tool handle. Cooperating locking elements are provided on both the tubular member and the cylindrical member for locking the tool head to the tool handle. The angle of the tool head to the handle can be adjusted.

13 Claims, 6 Drawing Sheets

CONNECTION FOR DETACHABLY CONNECTING A TOOL IMPLEMENT AND A TOOL HANDLE

CROSS REFERENCES TO RELATED APPLICATIONS

This application is a continuation-in-part of application Ser. No. 08/905,994 filed Aug. 4, 1997, now U.S. Pat. No. 5,971,653.

BACKGROUND OF THE INVENTION

1. Field of the Invention

The invention is directed toward a two-part connector where one part of the connector is rotatably adjustable relative to the other part of the connector. The invention is also directed toward a two-part connector where the one part is easily detachable from the other part. The invention is also directed toward a tool head using one part of the connector. The invention is further directed toward a tool using the connector to mount the tool head which carries one part of the connector, onto the handle of the tool, which carries the other part of the connector. The tool head is rotatably adjustable relative to the handle of the tool to allow the tool to perform different functions depending on the position of the tool head relative to the handle. The invention is further directed toward a tool using the connector to mount the tool head, carrying one part of the connector, on the handle of the tool, carrying the other part of the connector, so that the tool head is easily detachable from the handle.

2. Description of the Related Art Including Information Disclosed Under CFR §§1.97–1.99

Two-part connectors allowing one part to rotate relative to the other part so as to allow the angle of one part to be adjusted relative to the other part are known. An example of such a connector is shown in U.S. Pat. No. 1,255,428. Such connectors, using a pin to rotatably connect the parts, make separation of the parts difficult. Such connectors are also relatively weak since the pin employed is usually quite small. Stronger connectors are known as shown in U.S. Pat. No. 1,542,652 by way of example. This connector employs a channel connector part on one element, and a tubular connector part on another element which tubular part fits snugly into the channel part to connect the elements together. The element with the tubular part can be angularly adjusted relative to the element with the channel part, when the parts are separated, but the adjustment means is complicated in structure and awkward to use.

The patented connectors discussed above are used in tools, particularly gardening tools. The connectors allow the tool head to be adjusted relative to the handle of the tool so that the tool can be used for different jobs. Thus, a person can use one tool to perform more than one job depending on the position of the tool head and the person does not have to purchase a single tool for each job. While neither patent discloses a replaceable or substituted tool head, such a head could be provided. However, the attachment means used to connect the tool head to the tool handle in both patents makes replacement or substitution difficult.

SUMMARY OF THE INVENTION

It is the purpose of the present invention to provide a relatively simple two-part connector that allows one part to be easily, rotatably, adjusted relative to the other part. It is another purpose of the present invention to provide a two-part connector that can be easily assembled or disassembled. It is a further purpose of the present invention to provide a two-part connector that is simpler, stronger, cheaper and easier to use than the known connectors. It is also the purpose of the present invention to provide tool heads employing one part of the connector, and tools where the tool head and the tool handle employ the connector parts allowing the tool head to be easily adjusted relative to the handle or to be easily detached from the handle.

In accordance with the present invention, the connector employs a first part in the form of a cylindrical member and a second part in the form of a tubular member sized to snugly, rotatably, receive the cylindrical member. A first element is mounted on the cylindrical member by a pair of spaced-apart arms and a second element is mounted on the tubular member via a mounting member extending transversely from the tubular member. The cylindrical member is slidable axially into the tubular member to rotatably connect them together, there being a slot in the tubular member to pass one of the arms on the cylindrical member. Cooperating locking means are provided on the cylindrical and tubular members to lock them together when assembled. The locking means preferably comprise a movable lock member on the tubular member and at least two, and preferably a plurality of, openings on the cylindrical member to receive the locking member. The openings on the cylindrical member are spaced apart and extend in a circumferential direction about the member so that the position of the cylindrical member relative to the tubular member depends on the opening selected to receive the locking member.

The cylindrical member can be mounted by its arms on the non-working end of a tool head. The tubular member can be mounted on the end of a tool handle. When the cylindrical member is connected to the tubular member, the position of the tool head relative to the tool handle can be easily adjusted using the locking means. In addition, the tool head can be easily replaced or substituted.

By way of example, a tool can be provided having one handle and two different detachable tool heads, one head being a shovel blade with a square working end and the other head being a shovel blade with a pointed working end. Each detachable tool head has one part of the connector thereon and the handle has the other part of the connector thereon. Either head can be detachably mounted on the handle of the shovel using the connector parts on the heads and the handle depending on the job required. Each head can also be adjustably mounted relative to the handle, using the locking means, so that the head with a square end shovel blade can be used as an ordinary shovel, with the head in one position relative to the handle, or as a hoe, with the head in another position relative to the handle. The head with the pointed end shovel blade can also be used as an ordinary shovel, with the head in one position relative to the handle, or as a pick-type tool, with the head in another position relative to the handle. Thus, this tool, with one handle and two heads, can, with the connector, provide four different tools.

The invention in one embodiment is particularly directed toward a two-part connector having a first part in the form of a cylindrical member and a second part in the form of a tubular member. The tubular member is sized to snugly, rotatably, receive the cylindrical member. Cooperating locking means are provided on the cylindrical and tubular members to lock the cylindrical member to the tubular member preventing its rotation and lateral displacement relative to the tubular member when mounted thereon. Preferably, the locking means allows the cylindrical member to be locked to the tubular member in one of at least two positions so that the position of the cylindrical member can be rotatably adjusted relative to the tubular member when connected to it.

The invention, in a more specific embodiment, is particularly directed toward a tool head having a tool implement with a working end and an opposed non-working end. The first part of the two-part connector is provided at the non-working end of the tool implement for use in detachably connecting the tool head to a tool handle. The first part of the connector comprises a cylindrical member supported from the non-working end of the tool implement by a pair of spaced-apart arms, the cylindrical member extending transversely to the longitudinal axis of the tool implement.

The invention is also particularly directed toward a tool having a tool handle and a tool head. The tool handle has a shaft and a tubular member on one end of the shaft, the axis of the tubular member extending transverse to the shaft. The tool head has a tool implement with a working end and an opposed, non-working end. A cylindrical member is provided at the non-working end of the tool implement, the cylindrical member supported from the non-working end of the tool implement. The cylindrical member extends transversely to the longitudinal axis of the tool implement and is slidable into the tubular member to rotatably connect the tool head to the tool handle.

DESCRIPTION OF THE PREFERRED EMBODIMENTS

Figure 1:
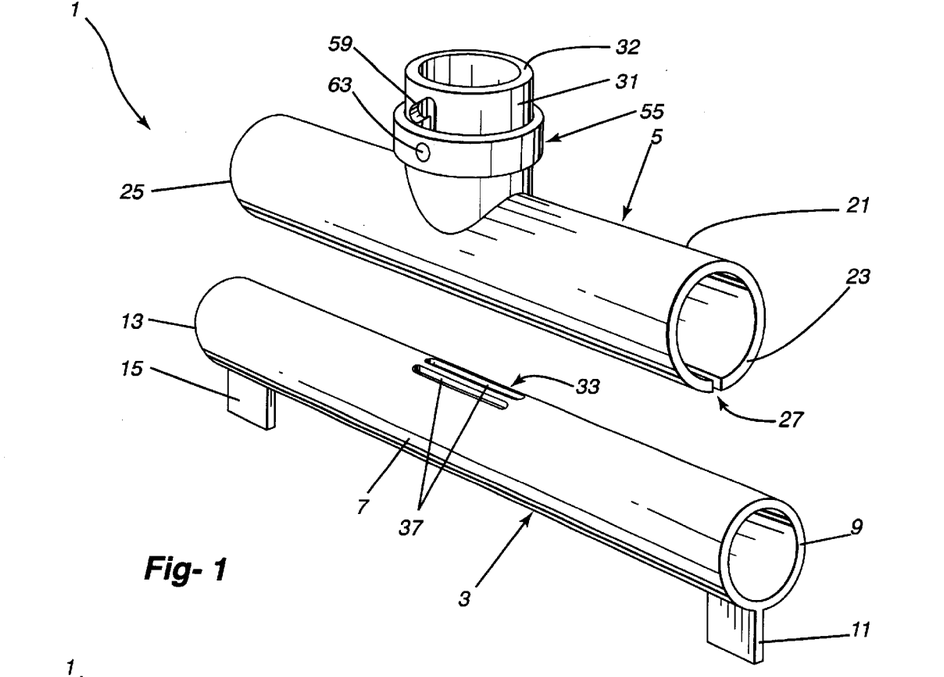
FIG. 1 is a perspective view of the two-part connector of the present invention with the parts detached.
Figure 2:
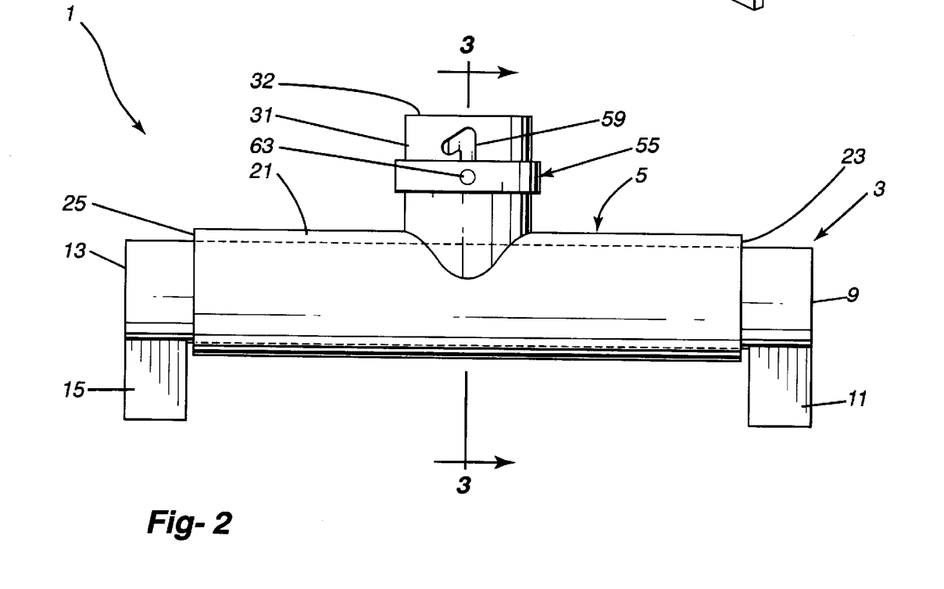
FIG. 2 is a front view of the connector with the parts assembled.

The connector 1 of the present invention, as shown in FIGS. 1 and 2, has first and second parts 3, 5. The first part 3 of the connector 1 is in the form of a cylindrical member 7. The cylindrical member 7 could be hollow to reduce weight. The cylindrical member 7 can be attached, at least at one end 9, by an arm 11 to a first element, not shown. Preferably, the cylindrical member 7, if space permits, is attached to the first element at both ends 9, 13 by arms 11, 15, one arm at each end.

The second part 5 of the connector 1, having a T-shape, has a tubular member 21 forming the cross-bar of the T-shape. The tubular member 21 is sized to snugly and rotatably receive the cylindrical member 7 of the first connector part 3. The tubular member 21 is open at at least one end 23 and preferably at both ends 23, 25. Preferably, the tubular member 21 has a longitudinal slot 27 extending between the ends 23, 25. An element mounting member, forming the stem of the T-shape, extends transversely from tubular member 21, the mounting member being in the form of a short tube 31 centrally located between the ends 23, 25 of the first tubular member 21. The tube 31 extends from the first tubular member 21 on the side opposite the side having the longitudinal slot 27. The free end 32 of the tube 31 receives the second element (not shown) to be connected by the connecting means 1 to the first element.

The cylindrical member 7 is mounted within the tubular member 21 by sliding it through one open end 23. If the cylindrical member 7 has two arms 11, 15, one at each end, the distance between the arms 11, 15 is just slightly greater than the length of the tubular member 21 and one arm 15 slides through slot 27 as the cylindrical member 7 is mounted within the tubular member 21 until the tubular member is located between the arms 11, 15. In this position, the tubular member 21 can rotate relative to the cylindrical member 7 without interference from the arms 11, 15.

Cooperating locking means 33, 35 are provided on the two parts 3, 5 of the connector 1 for locking the one part 3 relative to the other 5 when they are mounted together so as to normally prevent rotational movement between the parts, and also to prevent lateral movement between the parts. The locking means 33 on the part 3 comprises at least one, and preferably two or more openings 37 in the surface of the cylindrical member 7, the openings 37 spaced apart in the circumferential direction about the member 7. The openings 37 are centrally located lengthwise of the member 7. The openings 37 are also preferably in the form of narrow, elongated slots, elongated in a direction parallel to the longitudinal axis of the member 7.

Figure 3:
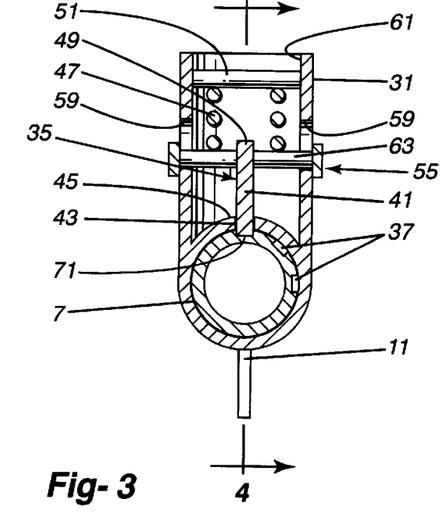
FIG. 3 is a cross section view of the connector taken along line 3—3 in FIG. 2 with the locking means locked.
Figure 4:
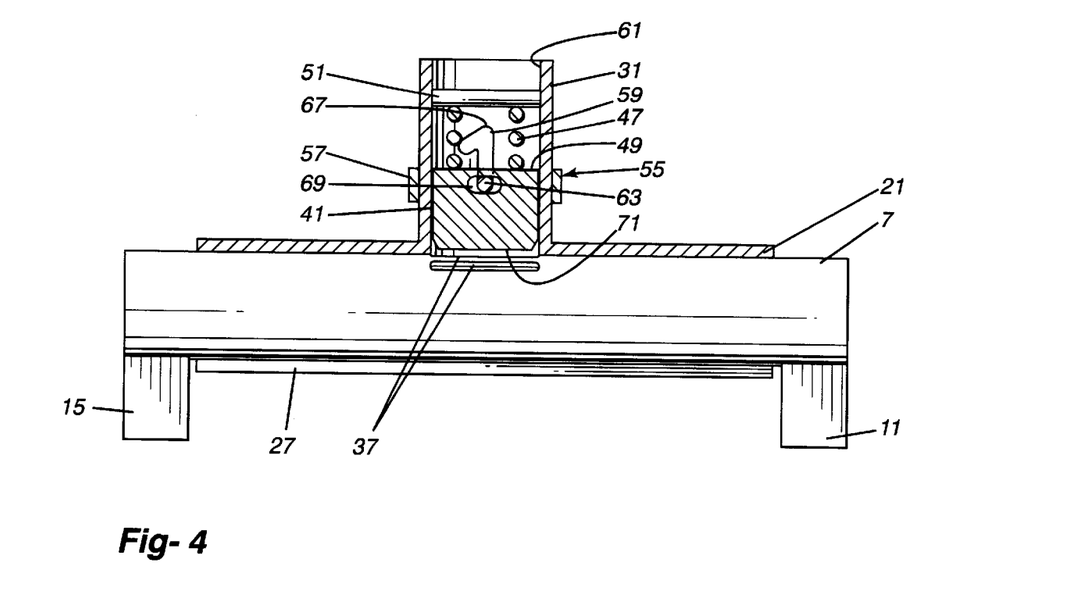
FIG. 4 is a cross-section view of the connector taken along line 4—4 in FIG. 3 with the locking means unlocked.

The locking means 35 on the part 5 of the connector 1 includes a lock member 41 carried by the tube 31, the lock member 41 extending transverse to the longitudinal axis of the tubular member 21, and slidable toward or away from the longitudinal axis of the tubular member. The lock member 41 is in the form of a narrow, elongated, flat tab. The lock member 41 projects through an opening 43 in the wall 45 of the tubular member 21, as shown in FIG. 3, to enter into the cylindrical space defined by the wall 45 which space is normally occupied by the cylindrical member 7. The lock member 41 is slidable in the tube 31 and is biased by a coil spring 47 toward the tubular member 21. The spring 47 is located between the top 49 of the lock member 41 and a stop 51 in the upper end of the tube 31. The stop 51 could be in the form of a pin passed through the wall of the tube 31.

Figure 5:
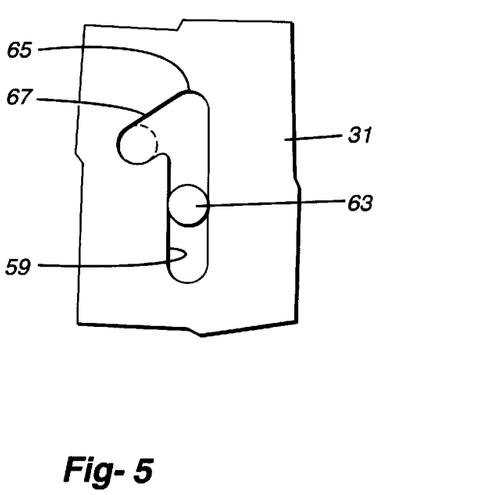
FIG. 5 is a partial side view showing one of the locking slots.

Moving means 55 are mounted on the tube 31 for moving the lock member 41 against the force of the spring 47 to move the lock member 41 away from the cylindrical member 7 to an unlocked position. The moving means 55 includes a collar 57 mounted on the outside of the tube 31 for sliding movement along the tube. The collar 57 is connected through opposed longitudinal, bayonet-type slots 59 in the tube wall 61 to the lock member 41 via a pin 63. The upper ends 65 of the slots 59 have short lateral extensions 67, as shown in FIG. 5, extending in opposed generally circumferential directions so the collar 57 can be rotated to locate the pin 63 in the extensions 67, as shown in dotted lines, to maintain the lock member 41 in a withdrawn, unlocked, position. The extensions 67 are preferably sloped downwardly to help retain the pin 63 therein. The lock member 41 has a centrally located opening 69 through which the pin 63 passes. The opening 69 is slightly elongated, elongated in the horizontal direction when viewing the drawings, to allow rotation of the collar 57, and thus of pin 63, to locate the pin 63 in the extensions 67. The upper ends 65 of the slots 59 limit the upward movement of the lock member 41. The lock member 41 is not permitted to move out of the opening 43 in the wall 45 so it remains aligned with the slots 37 in the cylindrical member 7 even in the unlocked position.

Moving the pin 63 out of the slot extensions 67 and in to alignment with the vertical slots 59, by rotating the collar 57 on the tube 31, allows the spring 47 to move the lock member 41, and attached collar 57, downwardly with the front end 71 of the lock member entering one of the openings 37 in the cylindrical member 7 aligned with the lock member.

The radial position of the cylindrical member 7 relative to the tubular member 21 can be changed by withdrawing the lock member 41, via the collar 57, from the one opening 37 it is in, rotating the tubular member 21 relative to the cylindrical member 7 till another opening 37 is aligned with the lock member 41, and then releasing the lock member to allow it to enter the other opening.

The two-part connector provides simple means for easily connecting two elements together. The connector also permits the angular position of the elements to be easily adjusted relative to one another. Using a connector with the lock means in the form of a tab/elongated slot, also allows the connector to be used with smaller diameter cylindrical members than a connector of the pin/cylindrical hole type. More elongated slots than cylindrical holes can be provided on the surface of the cylindrical member in lock means of equivalent strength. More slots allow the elements joined by the connector to be located in more positions relative to one another without sacrificing strength.

Figure 6:
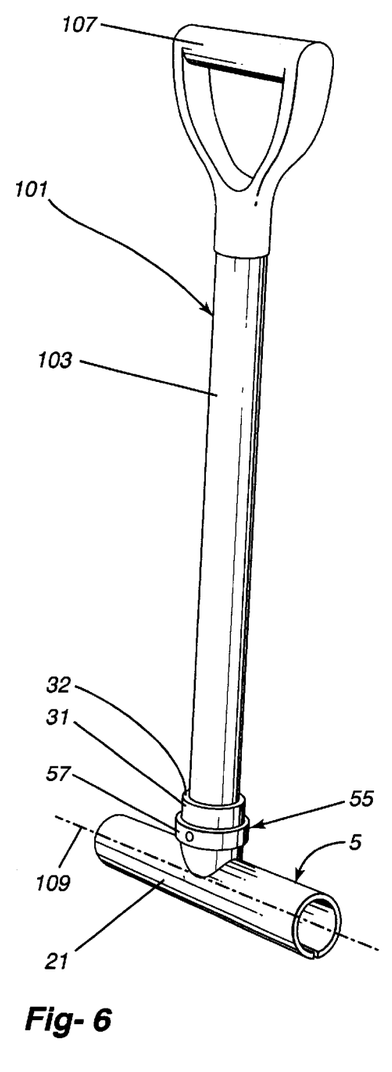
FIG. 6 is a perspective view of a tool handle using one part of the connector of the present invention.

An example in using the connector 1 will now be described with reference to a gardening tool. As shown in FIG. 6, the tool handle 101 of the gardening tool of the present invention has a shaft 103 and one part 5 of the connector 1 at one end of the shaft 103. The one end of the shaft 103 is mounted within the open upper end 32 of the tube 31 and fastened thereto by suitable means (not shown). A hand grip 107 can be provided at the other end of the shaft 103. The hand grip 107 can be detachably mounted on the other end of the shaft by suitable means (not shown). The longitudinal axis 109 of the tubular member 21 of the connector part 5 extends transversely to the shaft 103.

While the tool handle 101 has been described as one having a hand grip 107 at one end of the shaft, the handle can also be provided without a hand grip. Such a handle is normally longer than the handle with a hand grip, and is used with garden rakes and hoes by way of example. The shorter handle with a hand grip is normally used with shovels by way of example.

Figure 7:
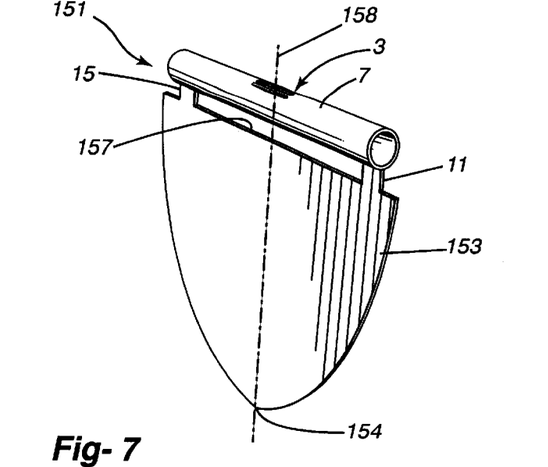
FIG. 7 is a perspective view of a tool head using the second part of the connector of the present invention.

The tool head 151 of the tool, as shown in FIG. 7, has an implement 153 such as a pointed shovel blade. The point 154 of the blade is the working end of the implement while the opposed upper end 157 of the blade is the non-working end. The first part 3 of the connector 1 is provided at the non-working end 157 of the implement 153. The connector part 3 is transverse to the longitudinal axis 158 of the implement 153. The cylindrical member 7, forming the part 3, is attached at its ends to the non-working end 157 of the implement 153 by the arms 11, 15 which are relatively short. The cylindrical member 7 is preferably hollow and is centrally located on the upper end 157 of the implement 153.

Figure 8:
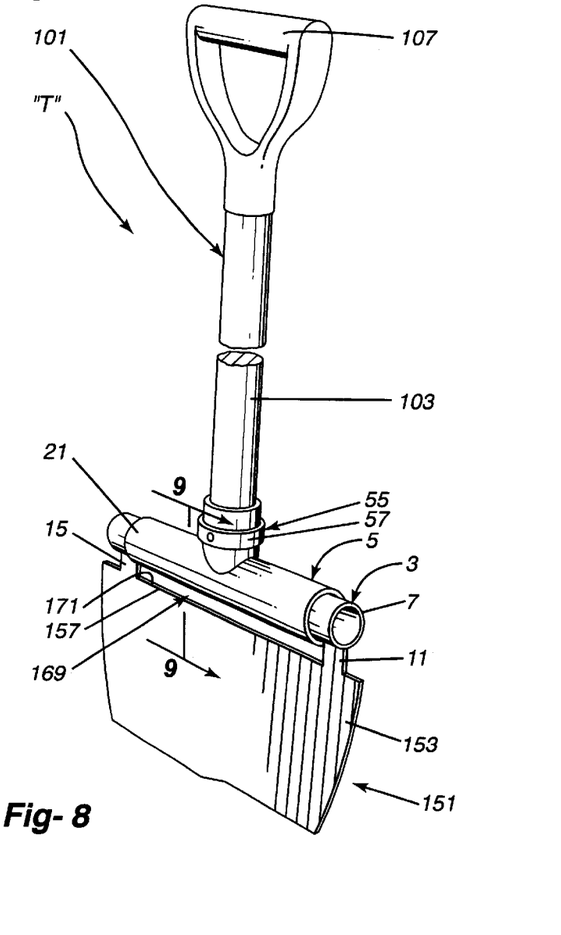
FIG. 8 is a perspective view of the tool assembled from the tool handle and tool head.
Figure 9:
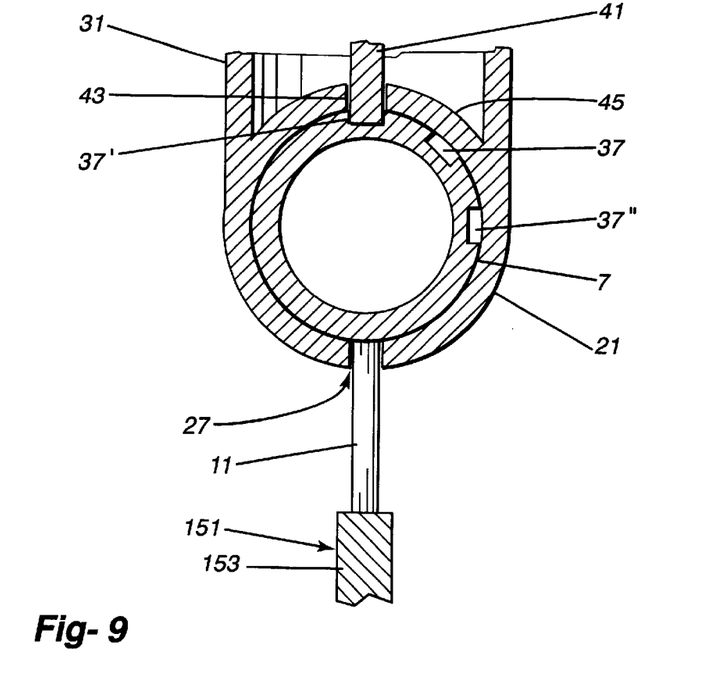
FIG. 9 is a cross-section view taken along line 9—9 of FIG. 8.
Figure 10:
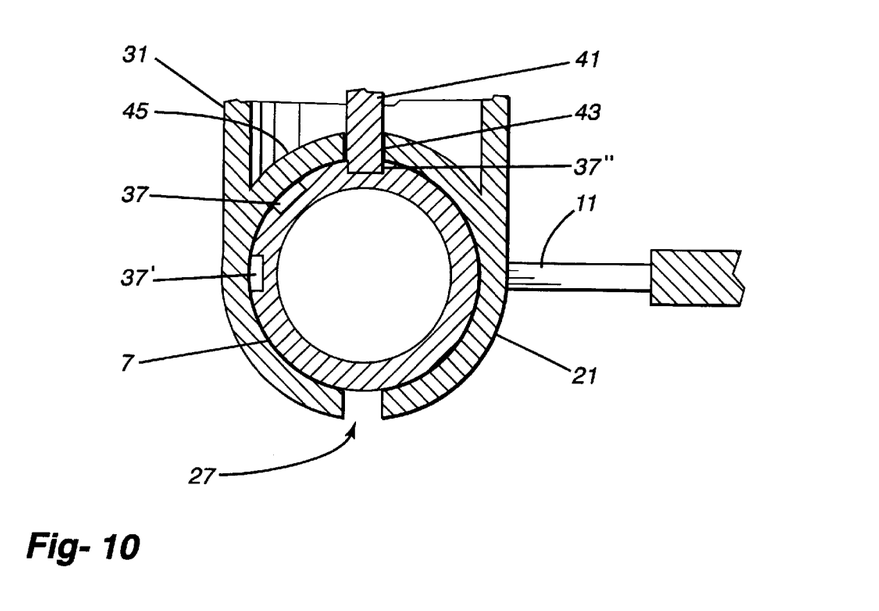
FIG. 10 is a cross-section view similar to FIG. 9 but with the tool head adjusted relative to the handle.

The tool "T", shown in FIGS. 8 and 9, is assembled by sliding the cylindrical member 7 of the connector part 3 on the tool head 151 into the tubular member 21 of the connector part 5 on the tool handle 101 while the collar 57 is raised to raise the lock member 41 to an unlocked position. The first arm 15 on the tool head 151 passes through the longitudinal slot 27 on the tubular member 21. The tool head 151 is moved until it is generally centered with respect to the tubular member 21 on the handle 101. In this position, the tubular member 21 is located between the arms 11, 15. The tool head 151 is now angularly adjusted until the free end 71 of the lock member 41 is aligned with the slot 37 selected for the tool head position desired. The collar 57 is then moved to release the lock member allowing it to move down, under the action of the spring 47, into the selected slot 37 to lock the tool head 151 in the selected position. For example, if the tool is to be used with the blade 153 extending straight down from the handle 101, so as to form a shovel, the tool head 151 is positioned to have the lock member 41 enter the slot 37' generally diametrically opposed to the blade 153 as shown in FIG. 9. In this position the handle 101 is generally aligned with the blade 153. If the tool is to be used with the blade 153 at a right angle to the handle 101, as shown in FIG. 10, to form a hoe, the tool head 151 is positioned to have the lock member 41 enter the slot 37" that is at a right angle to the plane of the blade 153. The tool head 151 is free to rotate relative to the tubular member 21 in repositioning it because of the gap 169 between the cylindrical member 7 and the top edge 171 of the blade 153 between the arms 11, 15. The lock member 41 on the connector 5, and the slots 37 on the connector 3, form cooperating locking means allowing the tool head 151 of the tool to be positioned at one of several positions relative to the tool handle 101.

Figure 11A:
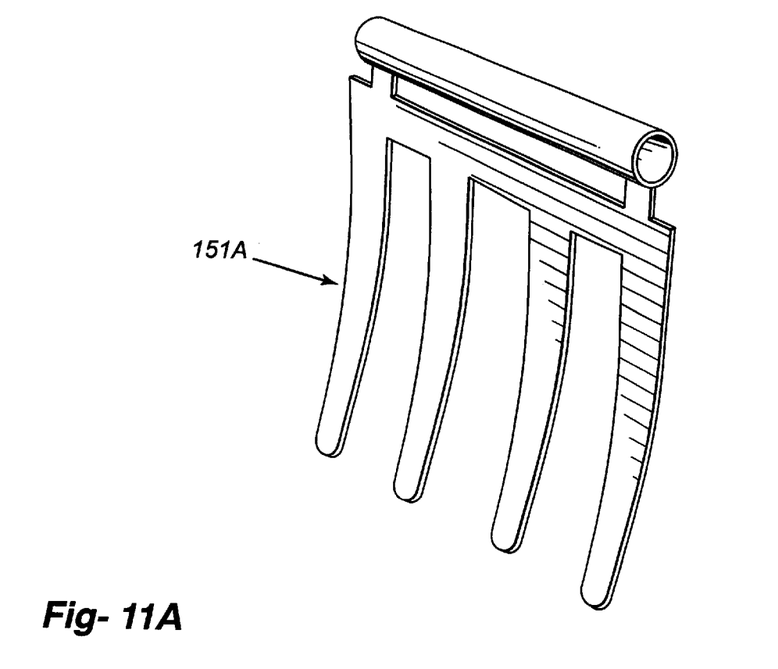
FIGS. 11A and 11B are perspective views of some of the other tool heads that can be used with the tool handle.
Figure 11B:
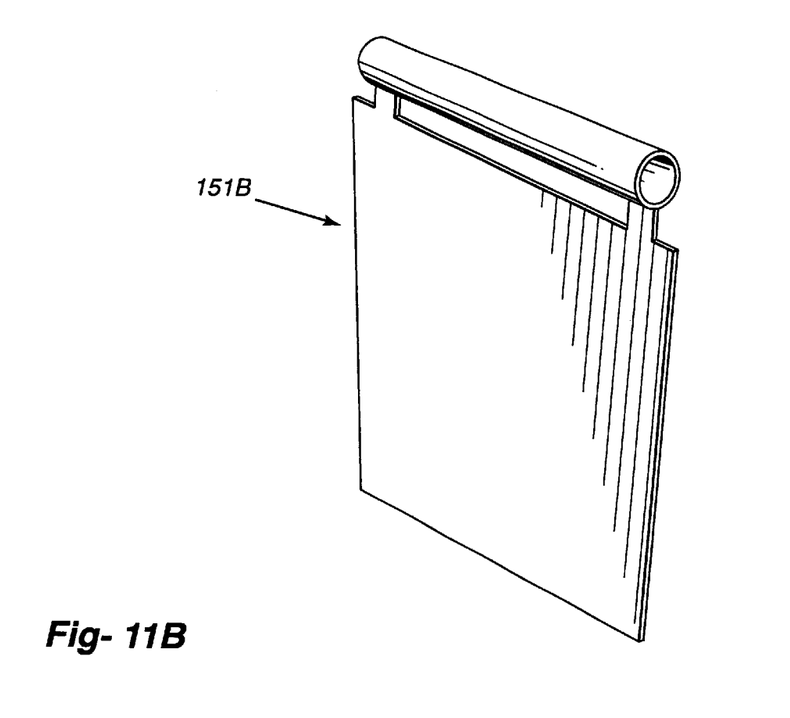

The tool head 151 can be easily replaced by another tool head. The tool head 151 is removed by lifting the collar 57 to raise the lock member 41, rotating the tool head 151 relative to the handle 101 to align the arms 11, 15 on the tool head 151 with the slot 27 on the handle 101 and then sliding the tool head 151 off the handle 101. A new tool head, such as fork tool head 151A, shown in FIG. 11A, or a square-bladed shovel tool head 151B, as shown in FIG. 11B, is slid in place on the handle 101 with the lock member 41 raised, and then locked in place by releasing the lock member 41 so it can enter a selected slot on the cylindrical member of the new tool head.

It will be seen that the tool of this invention permits many different tool heads to be used with only one handle. In addition, each tool head can be used in several positions on the handle, depending on the desired use of the tool head, providing added versatility for the tool.

Figure 12:
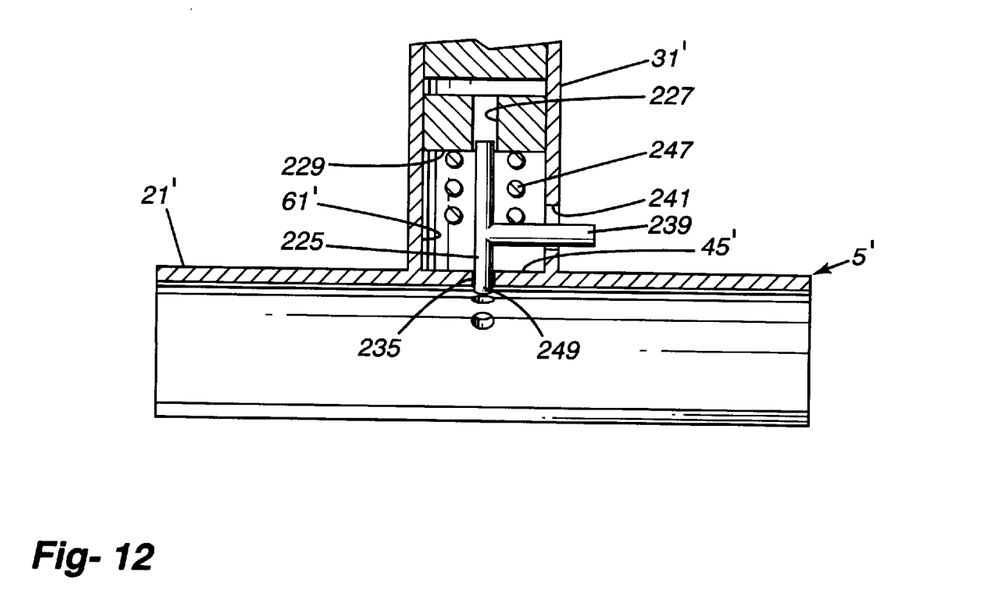
FIG. 12 is a cross-section view of another type of connecting part on the handle.

While the locking means 35 on the handle 101 has been described as using a narrow, elongated, tab 41, the tab could be replaced by a cylindrical pin if small size and strength required is not a factor. The cylindrical pin 225, as shown in FIG. 12, could be slidably mounted through a central bore 227 in a block 229 within the tube 31' of the connector part 5'. The pin 225 extends from the block 229 through a circular opening 235 in the wall 45' of the tubular member 21'. A handle 239 extends laterally from the pin 225 through a vertical slot 241 in the wall 61' of the tube 31'. A spring 247 is mounted between the handle 239 and the block 229 and serves to bias the round end 249 of the pin 225 through the wall 45' into the tubular member 21'.

Figure 13:
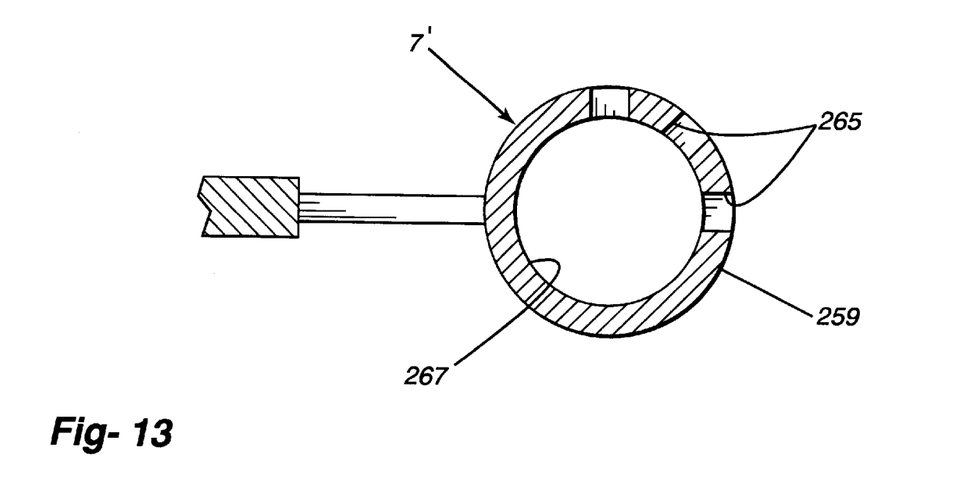
FIG. 13 is a cross-section view taken along line 13—13 in FIG. 12.

The cylindrical member 7' can have a plurality of circular openings 265 in its outer surface 259, as shown in FIG. 13, the openings extending along a circumferential line and spaced apart along the line. The openings 265 can extend through the wall 267 of the member 7' if desired. The openings 265 are located midway between the ends of the member 7'. The pin 225 enters a selected opening 265 to lock the members 7', 21' together so as to prevent relative rotation of the members and relative lateral movement of the members.

While the connector has been shown to be used with a gardening tool, it can obviously be used to connect any two elements in which one element has to be easily replaceable and/or in which the angular position of one element relative to the other has to be easily adjusted.

I claim:

1. A two-part connector having a first part in the form of a cylindrical member and a second part in the form of a tubular member with a tube extending transversely therefrom; the tubular member sized to snugly, rotatably, receive the cylindrical member; cooperating locking means on the first and second parts to selectively lock the tubular member to the cylindrical member preventing its rotation and lateral displacement relative to the cylindrical member when mounted thereon; the locking means on the first part comprising at least two openings on the surface of the cylindrical member, the openings spaced apart in the circumferential direction of the cylindrical member; the locking means on the second part comprising a lock member slidable axially in the tube, the lock member movable transversely to the longitudinal axis of the tubular member and sized to snugly fit into any one of the openings on the cylindrical member; a collar slidable on the tube; a pin traversing the collar and passing through elongated, aligned slots in the wall of the tube and through the lock member, the slots parallel to the longitudinal axis of the tube; the collar movable along the tube to move the lock member via the pin; spring means in the tube biasing the lock member, toward the tubular member, to a locking position; and slot extensions at the top of the slots extending transversely therefrom in opposite directions, the slot extensions receiving the pin when the collar is rotated at the top of the slots to retain the lock member in an unlocked position against the action of the spring means; the lock member having a slightly elongated hole through which the pin passes to permit the pin to be rotated relative to the lock member by the collar.

2. A two-part connector having a first part in the form of a cylindrical member and a second part in the form of a tubular member; the tubular member sized to snugly, rotatably, receive the cylindrical member; and cooperating locking means on the cylindrical and tubular members to selectively lock the tubular member to the cylindrical member preventing its rotation and lateral displacement relative to the cylindrical member when mounted thereon; the locking means on the cylindrical member comprising at least two openings on the surface of the cylindrical member, the openings spaced apart in the circumferential direction of the cylindrical member; the locking means on the tubular member comprising a lock member movable transversely to the longitudinal axis of the tubular member and sized to snugly fit into any one of the openings on the cylindrical member; the tubular member having an elongated slot extending between its ends; the cylindrical member having arms at each end extending radially therefrom to support an element, to be connected, between them; the distance between the arms being greater than the length of the tubular member; the arms sized to pass through the slot.

3. A tool having: a tool handle and a tool head; the tool handle having a shaft; a tubular member on one end of the shaft, the axis of the tubular member extending transverse to the shaft; the tool head having a tool implement, with a working end and an opposed, non-working end; a cylindrical member spaced a short distance from the non-working end of the tool implement, and connected to the non-working end by a pair of spaced-apart arms; a longitudinal slot in the tubular member extending between its ends and wide enough to pass the arms connecting the cylindrical member to the tool implement, the tubular member being shorter than the distance between the arms; the cylindrical member extending transversely to the longitudinal axis of the tool implement and slidable into the tubular member to rotatably connect the tool head to the tool handle.

4. A tool as claimed in claim 3 including locking means on the cylindrical member for cooperating with locking means on the tubular member for preventing rotation of the tool head relative to the tool handle when the cylindrical member of the tool head is mounted in the tubular member on the tool handle; the locking means on the cylindrical member comprising at least two openings on the cylindrical member spaced apart in a circumferential direction about the approximate center of the cylindrical member; the locking means on the tubular member comprising a lock member, the lock member movable transversely to the longitudinal axis of the tubular member and sized to snugly fit into any one of the openings on the cylindrical member whereby the position of the tool head relative to the handle can be selected from one of at least two positions depending on the opening used to lock the tool head to the tool handle.

5. A tool as claimed in claim 4 wherein the tubular member has a tube extending transversely therefrom, the tool handle connected to the free end of the tube; the lock member slidable axially in the tube; spring means in the tube biasing the lock member to a locking position; and moving means on the tube connected to the lock member to move it against the spring means to an unlocked position.

6. A tool as claimed in claim 5 wherein the moving means comprises a collar slidable on the tube; and a pin traversing the collar and passing through opposed slots in the wall of the tube, and through an opening in the lock member within the tube.

7. A tool as claimed in claim 6 wherein the slots are bayonet-type slots with a lateral extension at the top of each slot for receiving the pin with the lock member in a raised, unlocked position; the opening in the lock member being slightly elongated allowing the pin to rotate from the vertical slots into the lateral extensions.

8. A tool as claimed in claim 4 wherein the openings on the cylindrical member are narrow and elongated; the openings extending in a direction parallel to the longitudinal axis of the cylindrical member; and the lock member on the tubular member is in the form of a narrow, elongated, flat tab.

9. A tool head as claimed in claim 3 including locking means on the cylindrical member for cooperating with locking means on the tool handle for preventing rotation of the tool head relative to the tool handle when the tool head is mounted on the tool handle with the cylindrical member.

10. A tool having: a tool handle and a tool head; the tool handle having a shaft; a tubular member on one end of the shaft, the axis of the tubular member extending transverse to the shaft; the tool head having a tool implement, with a working end and an opposed, non-working end; a cylindrical member at the non-working end of the tool implement, the cylindrical member supported from the non-working end of the tool implement and integral with the tool implement; the integral cylindrical member extending transversely to the longitudinal axis of the tool implement and slidable into the tubular member to rotatably connect the tool head to the tool handle.

11. A tool as claimed in claim 10 including locking means on the cylindrical member for cooperating with locking means on the tubular member for preventing rotation of the tool head relative to the tool handle when the cylindrical member of the tool head is mounted in the tubular member on the tool handle; the locking means on the cylindrical member comprising at least two openings on the cylindrical member spaced apart in a circumferential direction about the approximate center of the cylindrical member; the locking means on the tubular member comprising a lock member, the lock member movable transversely to the longitudinal axis of the tubular member and sized to snugly fit into any one of the openings on the cylindrical member whereby the position of the tool head relative to the handle can be selected from one of at least two positions depending on the opening used to lock the tool head to the tool handle.

12. A tool as claimed in claim 11 wherein tubular member has a tube extending transversely therefrom, the tool handle connected to the free end of the tube; the locking member slidable axially in the tube; spring means in the tube biasing the lock member to a locking position; and moving means on the tube connected to the lock member to move it against the spring means to an unlocked position.

13. A tool head as claimed in claim 10 including locking means on the cylindrical member for cooperating with locking means on the tool handle for preventing rotation of the tool head relative to the tool handle when the tool head is mounted on the tool handle with the cylindrical member.

* * * * *